US008303754B2

(12) United States Patent
Higuchi

(10) Patent No.: US 8,303,754 B2
(45) Date of Patent: *Nov. 6, 2012

(54) GLASS SUBSTRATE WITH PROTECTIVE GLASS, PROCESS FOR PRODUCING DISPLAY DEVICE USING GLASS SUBSTRATE WITH PROTECTIVE GLASS, AND SILICONE FOR RELEASE PAPER

(75) Inventor: Toshihiko Higuchi, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/187,631

(22) Filed: Jul. 21, 2011

(65) Prior Publication Data

US 2011/0272090 A1 Nov. 10, 2011

Related U.S. Application Data

(60) Division of application No. 12/348,932, filed on Jan. 6, 2009, which is a continuation of application No. PCT/JP2007/063591, filed on Jul. 6, 2007.

(30) Foreign Application Priority Data

Jul. 12, 2006 (JP) ................................. 2006-191388

(51) Int. Cl.
*B29C 65/00* (2006.01)
*B32B 37/00* (2006.01)
*B32B 9/04* (2006.01)
*B32B 33/00* (2006.01)

(52) U.S. Cl. ........ 156/247; 156/278; 428/41.8; 428/447

(58) Field of Classification Search .................. 156/145, 156/147, 247, 278, 307.1, 307.3, 307.5; 428/40.1, 428/41.7, 41.8, 447
See application file for complete search history.

(56) References Cited

U.S. PATENT DOCUMENTS 5,869,150 A 2/1999 Iwamoto
(Continued)

FOREIGN PATENT DOCUMENTS

JP 58-54316 3/1983
(Continued)

OTHER PUBLICATIONS

Office Action issued Mar. 28, 2011 in Taiwanese Application No. 096125264 (w/English translation).
(Continued)

*Primary Examiner* — Sing P Chan
(74) *Attorney, Agent, or Firm* — Oblon, Spivak, McClelland, Maier & Neustadt, L.L.P.

(57) ABSTRACT

To provide a glass substrate with protective glass which suppresses formation of microscopic scratches on the back surface of the glass substrate in the production process for a display device, and which prevents a strength decrease in the process or formation of etch pits after a chemical etching treatment; a process for producing a display device by using the glass substrate with protective glass; and silicone for release paper for the glass substrate with protective glass. A glass substrate with protective glass, which comprises a glass substrate and a protective glass substrate laminated on each other, and which is characterized in that the glass substrate and the protective glass substrate are laminated by a resin layer having removability.

15 Claims, 1 Drawing Sheet

U.S. PATENT DOCUMENTS

| | | | |
|---|---|---|---|
| 5,985,396 A * | 11/1999 | Kerins et al. | 428/41.8 |
| 6,287,674 B1 * | 9/2001 | Verlinden et al. | 428/210 |
| 7,799,433 B2 | 9/2010 | Nakamura et al. | |
| 2008/0135175 A1 | 6/2008 | Higuchi | |
| 2009/0321005 A1 | 12/2009 | Higuchi et al. | |

FOREIGN PATENT DOCUMENTS

| | | |
|---|---|---|
| JP | 3-5718 | 1/1991 |
| JP | 8-86993 | 4/1996 |
| JP | 9-105896 | 4/1997 |
| JP | 2000-241804 | 9/2000 |
| JP | 2000-252342 | 9/2000 |
| JP | 2003-216068 | 7/2003 |
| JP | 2005-1953 | 1/2005 |
| JP | 2006-16555 | 1/2006 |
| TW | 200616918 | 6/2006 |
| WO | WO 2005/116159 | 12/2005 |
| WO | 2006-003853 | 1/2006 |

OTHER PUBLICATIONS

Silicon Material Handbook, edited and published by Dow Corning Toray Silicon Company Ltd., 1993, pp. 88-101.

* cited by examiner

GLASS SUBSTRATE WITH PROTECTIVE GLASS, PROCESS FOR PRODUCING DISPLAY DEVICE USING GLASS SUBSTRATE WITH PROTECTIVE GLASS, AND SILICONE FOR RELEASE PAPER

TECHNICAL FIELD

The present invention relates to a glass substrate to be used for a display device such as a liquid crystal display or an organic EL display, more specifically, a laminated body of a glass substrate and a back-protective glass substrate, to be used for producing a display device by using such a glass substrate, a process for producing a display device by using the laminate, and silicone for release paper for the glass substrate with protective glass.

BACKGROUND ART

A process for producing a liquid crystal display device (LCD) generally comprises a step of forming an array on a glass substrate, a step of forming a color filter on a glass substrate different from the above glass substrate, a step of bonding the glass substrate having an array formed thereon with the glass substrate having a color filter formed thereon (an array/color filter bonding step), a step of injecting liquid crystal and a step of sealing the injection inlet. In each of the steps, since a back surface of the glass substrate, namely, an opposite surface from the surface on which an array or a color film is to be formed, is directly contacted with a carrier jig, a hotplate, etc., whereby microscopic scars are formed on its surface, which causes a strength decrease of the glass substrate itself.

In the field of a medium or small sized liquid crystal display (LCD), an organic EL display device (OLED), particularly, a portable display device such as a mobile, a digital camera or a cellular phone, weight saving and reduction in thickness of a display device have been important objects, and since the reduction in thickness of the glass substrate has been progressed, the strength decrease of the glass substrate originated from such a step has especially been a serious problem.

Further, in order to make a glass substrate thinner, a step of carrying out a chemical etching treatment on a glass substrate to make the substrate thickness thin after the array/color filter bonding step, has been widely applied, but in a case where if microscopic scars formed in the above step are present on the glass substrate, pits (etch pits) having a diameter of from tens to hundreds μm will be formed on the glass substrate surface after the chemical etching treatment, which would lead to optical defects.

Therefore, in order to overcome the above problem, a process for producing a display device has been suggested, wherein a prescribed treatment for producing a display device is carried out in such a state that a glass substrate is bonded with another protective glass substrate, and after the completion of the treatment, the glass substrate and the protective glass substrate are separated (e.g. Patent Documents 1 to 6).

In these processes for producing a display device, a method for laminating and fixing the glass substrate and the protective glass substrate on each other may, for example, be a method of fixing them by means of electrostatic adsorptivity or vacuum adsorptivity caused between the glass substrates (e.g. Patent Document 1), a method of fixing both ends of the glass substrates by means of glass frit (e.g. Patent Document 2), a method of fusing the two glass substrates by irradiating the vicinity of the edge surfaces of peripheral portions with laser beams (e.g. Patent Document 3), and a method of disposing a removable adhesive or adhesive sheet over the entire surfaces of the glass substrates, and fixing them by the adhesive force (e.g. Patent Documents 4 to 6).

These methods have latent problems which may adversely affect a display device to be produced.

That is, by the method of fixing the glass substrates by means of electrostatic adsorptivity or vacuum adsorptivity, the method of fixing both ends of the glass substrates by means of glass frit, or the method of fusing the two glass substrates by irradiating the vicinity of edge surfaces of peripheral portions with laser beams, it is difficult to avoid inclusion of bubbles or convex defects due to foreign matters such as dust in the process of laminating and closely bonding the glass substrates without any interlayer, and accordingly it is difficult to obtain a glass substrate laminate having a smooth surface.

In the case of the method of disposing a removable adhesive or adhesive sheet over the entire surface of the glass substrates, it is easy to avoid inclusion of bubbles as compared with the case of directly laminating the glass substrates, and it is considered that convex defects due to foreign matters are less likely to occur. However, it is difficult to separate the glass substrate and the protective glass substrate, and the glass substrate may be broken at the time of separation. Further, remaining of the adhesive on the glass substrate after the separation is also problematic. Further, the display device production process comprises a step which requires treatment at high temperature, such as a step of firing an insulating film or an alignment film in a process for producing a liquid crystal display device. Therefore, heat resistance is required for the adhesive or adhesive sheet, to be used for the display device, but a method which satisfies both heat resistance and removability has not been proposed yet.

Patent Document 1: JP-A-2300-241804
Patent Document 2: JP-A-58-54316
Patent Document 3: JP-A-2003-216068
Patent Document 4: JP-A-8-86993
Patent Document 5: JP-A-9-105896
Patent Document 6: JP-A-2000-252342

DISCLOSURE OF THE INVENTION

Objects to be Solved by the Invention

In order to solve the above problems of conventional techniques, the present invention has objects to provide a glass substrate with protective glass which suppresses formation of microscopic scars on a back-surface of a glass substrate in a step of producing a display device, and which prevents a strength decrease of the glass substrate in the step or prevents formation of etch pits by chemical etching treatment; a process for producing a display device by using the glass substrate with protective glass; and silicone for release paper for the glass substrate with protective glass.

Means to Accomplish the Objects

In order to accomplish the above objects, the present invention provides a glass substrate with protective glass (hereinafter, in the present invention, referred to as a glass substrate with protective glass of the present invention), which comprises a glass substrate and a protective glass substrate laminated on each other, and which is characterized in that the glass substrate and the protective glass substrate are laminated by a resin layer having removability.

The resin layer having removability is preferably fixed on a surface of the protective glass substrate.

The resin layer having removability is preferably an acrylic resin layer, a polyolefin resin layer, a polyurethane resin layer or a silicone resin layer.

The silicone resin layer is preferably a silicone resin layer having releasability and non-adhesive property, or a silicone resin layer having releasability and slight adhesive property.

The silicone resin layer having releasability and non-adhesive property, or the silicone resin layer having releasability and slight adhesive property, further preferably has low silicone migration property.

The silicone resin layer having releasability and non-adhesive property, or the silicone resin layer having releasability and slight adhesive property, is preferably a layer made of a cured product of silicone for release paper.

The cured product of silicone for release paper, is preferably a crosslinked product of a linear polyorganosiloxane having vinyl groups at both terminals and/or in its side chain, and a methylhydrogen polysiloxane having hydrosilyl groups in its molecule.

Before curing, the cured product of silicone for release paper preferably has a molar ratio of hydrosilyl groups of the methylhydrogen polysiloxane to vinyl groups of the linear polyorganosiloxane being from 1.3/1 to 0.7/1.

In the glass substrate with protective glass of the present invention, the thickness of the glass substrate is preferably less than 1.0 mm, and the total thickness of the protective glass substrate and the resin layer having removability is preferably at least 0.1 mm.

In the glass substrate with protective glass of the present invention, the difference between the linear expansion coefficient of the glass substrate and the linear expansion coefficient of the protective glass substrate is preferably at most $15 \times 10^{-7}/°C$.

Further, the present invention provides a process for producing a display device by using a glass substrate with protective glass (hereinafter referred to as "a process for producing a display device of the present invention"), which comprises a step of forming a resin layer having removability on a protective glass substrate, a step of laminating a glass substrate on the resin layer-formed surface of the protective glass substrate, a step of carrying out a prescribed treatment for producing a display device on the glass substrate, and a step of separating the glass substrate from the protective glass substrate.

In the process for producing a display device of the present invention, the resin layer having removability is preferably an acrylic resin layer, a polyolefin resin layer, a polyurethane resin layer or a silicone resin layer.

The silicone resin layer is preferably a silicone resin layer having releasability and non-adhesive property, or a silicone resin layer having releasability and slight adhesive property.

The silicone resin layer having releasability and non-adhesive property, or the silicone resin layer having releasability and slight adhesive property, is preferably a layer made of a cured product of silicone for release paper.

The cured product of silicone for release paper, is a crosslinked product of a linear polyorganosiloxane having vinyl groups at both terminals and/or in its side chain, and a methylhydrogen polysiloxane having hydrosilyl groups in its molecule.

In the silicone for release paper, the molar ratio of hydrosilyl groups of the methylhydrogen polysiloxane to vinyl groups of the linear polyorganosiloxane is preferably from 1.3/1 to 0.7/1.

In the process for producing a display device of the present invention, a step of forming a resin layer having removability on a back-protective glass substrate, preferably includes applying silicone for release paper on the protective glass substrate, followed by curing the silicone for release paper.

The silicone for release paper preferably contains a linear polyorganosiloxane having vinyl groups at both terminals and/or in its side chain, a methylhydrogen polysiloxane, and a platinum catalyst.

The silicone for release paper preferably contains substantially no unreactive silicone.

The application of the silicone for release paper is preferably carried out by a die coating method, a spin coating method or a screen printing method.

The silicone for release paper is preferably heat-cured at a temperature of from 50 to 250° C.

The step of laminating a glass substrate on the resin layer-formed surface of the protective glass substrate, is preferably carried out by using vacuum pressing or vacuum lamination.

Further, the present invention provides a silicone for release paper for a glass substrate with protective glass, which is to be used for laminating the glass substrate and the back-protective glass substrate.

The silicone for release paper of the present invention preferably contains a linear polyorganosiloxane having vinyl groups at both terminals and/or in its side chain, a methylhydrogen polysiloxane having a hydrosilyl groups in its molecule, and a platinum catalyst.

In the silicone for release paper of the present invention, the molar ratio of hydrosilyl groups of the methylhydrogen polysiloxane to vinyl groups of the linear polyorganosiloxane is preferably from 1.3/1 to 0.7/1.

Effects of the Invention

The glass substrate with protective glass of the present invention comprises a glass substrate and a protective glass substrate laminated on each other by a resin layer having removability, whereby by pressure bonding them by means of rolls or a press, it is possible to easily laminate the both substrates. Especially, when the glass substrate and the protective glass substrate were laminated by using a vacuum lamination method or a vacuum pressing method, inclusion of bubbles is suppressed, and adhesion properties are good. Further, even when a foreign matter such as dust is included at the interface of the laminated layers, convex defects of the glass substrates are unlikely to occur by deformation of the resin layer having flexibility.

Further, when lamination of the glass substrate and the protective glass substrate is carried out by a vacuum lamination method or a vacuum pressing method, even if very small bubbles remain, the bubbles will not grow by heating, whereby convex defects are less likely to occur in the glass substrate.

Furthermore, when a silicone resin layer having releasability and non-adhesive property, or a silicone resin layer having releasability and slight adhesive property, is used as the resin layer having removability, bubbles are hardly included particularly at the time of lamination, and even when bubbles are included, the bubbles are easily removed by carrying out press bonding by means of rolls or a press, and the heat resistance is also good.

The glass substrate with protective glass of the present invention comprises a glass substrate and a protective glass substrate laminated via a resin layer having removability, and the back surface of the glass substrate (an opposite surface from a surface on which an array or a color filter is formed) is not directly contacted to a carrier jig or a hotplate, in a step of forming a display device, whereby there is no concern that scratches are formed on the back surface of the glass substrate in the step. Further, the back surface of the glass substrate is contacted with a flexible resin layer having removability, which is fixed on the surface of the protective glass substrate, whereby it is possible to easily separate the laminate into the glass substrate and the protective glass substrate, and during the separation into the glass substrate and the protective glass substrate, no scratches are formed on the back surface of the glass substrate, and the glass substrate is unlikely to be broken.

Therefore, it is possible to significantly suppress the decrease in strength of the glass substrate after the protective glass substrate is removed and to suppress the etch pit formation when a chemical etching treatment is carried out afterwards.

In the process for producing a display device of the present invention, when a step of laminating the glass substrate on a surface of the protective glass substrate where the resin layer having removability is formed, by using vacuum pressing or vacuum lamination, it is possible to suppress inclusion of bubbles into the resin layer. As a result, there is an advantage that in a step of forming transparent electrodes of e.g. ITO under a vacuum atmosphere, it is possible to suppress formation of defects originated from air bubbles included in the resin layer.

MEANINGS OF SYMBOLS

Figure 1:
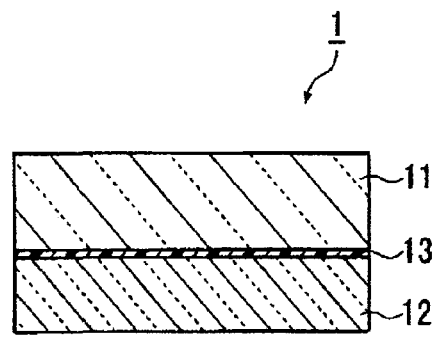
FIG. 1 is a cross-sectional schematic view illustrating a glass substrate with protective glass produced in Example 1.

1: Glass substrate with protective glass
11: Glass substrate
12: Protective glass substrate
13: Silicone resin layer
20, 21, 25, 26, 30 and 31: Polycarbonate member

BEST MODE FOR CARRYING OUT THE INVENTION

Now, the glass substrate with protective glass will be described.

The glass substrate with protective glass of the present invention comprises a glass substrate and a protective glass substrate laminated on each other, and is characterized in that the glass substrate and the protective glass substrate are laminated by a resin layer having removability.

Here, the resin layer having removability is preferably fixed on a surface of the protective glass substrate. That is, the removability of the resin layer is preferably exhibited by the relation with the glass substrate.

The glass substrate is a glass substrate for a display device such as LCD or OLED and has a thickness of from 0.1 mm to 0.7 mm. The thickness of the glass substrate is preferably from 0.4 mm to 0.7 mm for such a reason that such a glass substrate is easy to handle at the time of producing a display device by using the glass substrate, and that the glass substrate rarely breaks when it is handled. When the glass substrate is made thin by carrying out a chemical etching treatment, from a glass substrate having a thickness of from 0.4 mm to 0.7 mm, a glass substrate having a thickness of from 0.1 mm to 0.4 mm may be obtained.

Further, the display device as an object of the present invention is a medium or small sized display device which is to be used mainly for a mobile terminal such as a cellular phone or PDA, or a digital camera. The display device is mainly LCD or OLED, and LCD includes TN-type, STN-type, FE-type, TFT-type and MIM-type.

Characteristics required for the glass substrate, such as the heat shrinkage ratio, surface shape and chemical resistance, vary depend on the type of a display device. Accordingly, the glass substrate may be made of alkali glass. However, alkali-free glass is preferred since the heat shrinkage ratio is small.

In the present invention, the glass substrate is preferably one having a small heat shrinkage ratio. In the case of glass, the linear expansion coefficient defined in JIS R3102 (1995) is used as an index for heat expansion and heat shrinkage. The glass substrate preferably has the linear expansion coefficient of of at most $50 \times 10^{-7}$/° C., more preferably at most $45 \times 10^{-7}$/° C., more preferably at most $40 \times 10^{-7}$/° C., more preferably at most $30 \times 10^{-7}$/° C., more preferably at most $20 \times 10^{-7}$/° C.

The protective glass substrate is laminated on the glass substrate for a purpose of preventing formation of scars on the back surface of the glass substrate in the step. Here, the back surface of the glass substrate is a surface opposite from a surface on which an array or a color filter is to be formed, in a production step of LCD, and it is a surface which is directly contacted with a carrier jig, a hotplate, etc. The thickness of the protective glass substrate is not particularly limited, but it is preferably a thickness for a laminate with the glass substrate to be transported by the current production line. For example, the current production line is designed to transport a substrate having a thickness of 0.5 mm, whereby when the thickness of the glass substrate is 0.3 mm, the thickness of the protective glass substrate is preferably 0.2 mm combined with the thickness of the resin layer having removability. The most common current production line is one designed to transport a glass substrate having a thickness of 0.7 mm. In such a case, when the substrate thickness of the glass substrate is 0.4 mm, the substrate thickness of the protective glass substrate is preferably 0.3 mm as combined with the thickness of the resin layer having removability. However, the production line is not limited to one designed to transport a glass substrate having a thickness of 0.5 mm or 0.7 mm, but it is sometimes designed to transport a glass substrate having a thickness other than such a thickness. For example, there is a case where the line is designed to transport a glass substrate having a thickness of less than 0.5 mm, and there is also a case where the line is designed to transport the glass substrate having a thickness of more than 0.7 mm, e.g. 1.1 mm. In such a case, when the thickness of the glass substrate is 0.7 mm, the thickness of the protective glass substrate is preferably 0.4 mm as combined with the thickness of the resin layer having removability.

Taking the thickness of the resin layer having removability which will be described later, into a consideration, the thickness of the protective glass substrate is preferably from 0.1 to 0.8 mm as combined with the thickness of the resin layer having removability.

Further, the protective glass substrate is one to prevent scratches to be formed on the back surface of the glass substrate, and its material is not particularly limited. Namely, it may be either alkali glass or alkali-free glass. However, the linear expansion coefficient of the protective glass substrate is preferably substantially the same as the linear expansion coefficient of the glass substrate. When the linear expansion coefficient of the protective glass substrate is larger than the linear expansion coefficient of the glass substrate, in a heating step in the production process for a display device, expansion of the protective glass substrate is suppressed by the glass substrate with protective glass, whereby the glass substrate with protective glass will have warpage. On the other hand, when the linear expansion coefficient of the protective glass substrate is smaller than the linear expansion coefficient of the glass substrate, by the expansion of the glass substrate, the glass substrate is peeled from the resin layer having removability, such being disadvantageous.

In the present specification, the case where the linear expansion coefficients are substantially the same, does not mean that the linear expansion coefficient of the glass substrate completely matches with the linear expansion coefficient of the protective glass substrate, and there may be some difference between them. The difference in the linear expansion coefficient between the glass substrate and the protective glass substrate is preferably at most $35 \times 10^{-7}/°$ C., more preferably at most $25 \times 10^{-7}/°$ C., further preferably at most $15 \times 10^{-7}/°$ C.

Further, since the protective glass substrate has an object to protect the back surface of the glass substrate, its size is preferably equal to or larger than the size of the glass substrate.

When the glass substrate with protective glass of the present invention is to be produced, a resin layer having removability is formed on a protective glass substrate, and then, a glass substrate is laminated on the resin layer-formed surface of the protective glass substrate. More specifically, they are laminated so that the resin layer-formed surface of the protective glass substrate and the back surface of the glass substrate face each other.

In the present specification, "a resin layer having removability" means a resin layer having proper flexibility so that it can follow micro-irregularities of the glass substrate. Specifically, it is possible to use either a resin layer having releasability and proper adhesive property (slight adhesive property) or a resin layer having releasability and non-adhesive property.

The resin layer having removability is preferably an acrylic resin layer, a polyolefin resin layer, a polyurethane resin layer or a silicone resin layer.

Among them, the resin layer having removability is particularly preferably a silicone resin layer having releasability and non-adhesive property, or a silicone resin layer having releasability and slight adhesive property.

The silicone resin layer having releasability and non-adhesive property is a silicone resin layer having proper flexibility, and it is not one to fix the glass substrate by adhesive force, like an adhesive, but it is one to fix the glass substrate by a force attributable to a Van der Waals force between the faced solid molecules, namely, a bonding strength.

On the other hand, the silicone resin layer having releasability and slight adhesive property is one to fix the glass substrate by a certain level of adhesive force in addition to the above bonding strength. Further, the silicone resin layer having releasability and non-adhesive property, and the silicone resin layer having releasability and slight adhesive property, will be generally referred to as "a silicone resin layer having releasability and weak adhesive property".

Specifically, the silicone resin layer having releasability and weak adhesive property fixes the glass substrate by a bonding strength or by a bonding strength and a slight adhesive force, whereby a force to slide the glass substrate and the protective glass substrate in parallel to the interface of the laminated layer, namely, a shear force, shows a high value. Therefore, the glass substrate will not be displaced from the protective glass substrate in the production process for a display device. Accordingly, there will be no such a trouble that the substrates are separated by such displacement.

With respect to the shear force of the silicone resin layer having releasability and weak adhesive property, since the glass substrate will not be displaced from the protective glass substrate during the production process for a display device, in a shear strength test which will be described later, the load when glass is peeled off is preferably at least $0.1$ kg wt/cm$^2$, particularly at least $0.3$ kg wt/cm$^2$, further preferably at least $0.5$ kg wt/cm$^2$.

However, in a case where the thicknesses of both the glass substrate and the protective glass substrate are large, for example, when the thickness of a thinner substrate between the glass substrate and the protective glass substrate, is at least $0.7$ mm, the property of the resin layer to follow the shapes of the substrates decreases, whereby the force to fix the glass substrate may be insufficient by only a bonding strength. In such a case, it is preferred to use a silicone resin layer having releasability and slight adhesive property. The silicone resin layer having releasability and slight adhesive property has relatively low peeling force, preferably at most $0.8$ kg wt/cm$^2$.

In the case of the silicone resin layer having releasability and slight adhesive property, a glass substrate is fixed by a proper adhesive force in addition to a bonding strength, whereby even if the thicknesses of both the glass substrate and the protective glass substrate are large, the force to fix the glass substrate will not be insufficient. Besides, the peeling force is at most $0.8$ kg wt/cm$^2$, whereby the force required to peel the glass substrate from the protective glass substrate, namely, the peeling force, is low, and it is possible to easily separate the protective glass substrate from the glass substrate after a prescribed treatment to produce a display device on the glass substrate, is carried out.

On the other hand, due to the releasability and weak adhesive property of the silicone resin layer, the force to peel the glass substrate from the protective glass substrate in a perpendicular direction, namely, the peeling force, is low. Therefore, it is possible to easily separate the protective glass substrate from the glass substrate after a prescribed treatment for producing a display device on the glass substrate, is carried out.

With respect to the peeling force of the silicone resin layer having releasability and weak adhesive property, from the viewpoint that the protective glass substrate can easily be separated from the glass substrate, the load to peel the protective glass substrate in a peel test (1), which will be described later, is preferably at most $2$ kg wt/cm$^2$, particularly preferably at most $1$ kg wt/cm$^2$ further preferably at most $0.8$ kg wt/cm$^2$. When a flexible substrate capable of roll-to-roll such as a resin film, is used as the protective glass substrate, the peeling force should be evaluated by a peel test with an angle such as a 90° peel test or a 180° peel test. However, in a peel test for glass substrates having a certain level of rigidity, it is necessary to evaluate the peeling force by a testing method such as the peel test (1) (namely, a 0° peel test). Therefore, even when the peeling force is evaluated, it is preferably in the above range by a testing method such as the peel test (1).

Specific modes of the silicone resin layer having releasability and non-adhesive property, and the silicone resin layer having releasability and slight adhesive property, will be described later. With respect to the silicone resin layer having releasability and non-adhesive property, its surface energy is preferably from 16 to 21 erg/cm$^2$ (unit), for a reason that air bubbles included at the time of lamination, can easily be removed, and the protective glass substrate can easily be separated from the glass substrate.

The silicone resin layer having releasability and weak adhesive property is excellent in heat resistance, whereby even after a heating treatment, e.g. after heating at a temperature of 300° C. in atmosphere for 1 hour, it is possible to exhibit the above characteristics such that the peeling force is low, while the shear force is high.

Hereinafter, in the present specification, the silicone resin layer having releasability and weak adhesive force, will be generally referred to as "a silicone resin layer of the present invention" when it shows the common characteristics.

Since the silicone resin layer of the present invention, has proper flexibility, bubbles are less likely to be included at the time of lamination, and even if bubbles are included, since the surface of the resin layer is non-adhesive or slightly adhesive, the bubbles can easily be removed by pressure bonding by means of rolls, press or the like.

The silicone resin layer of the present invention is preferably a cured product of a silicone for release paper. The silicone for release paper comprises, as the chief agent, a silicone containing a linear dimethyl polysiloxane in its molecule which is particularly excellent in release properties among silicones. The silicone for release paper contains the chief agent and a crosslinking agent and is fixed on the surface of the substrate by curing by means of a catalyst, a photopolymerization initiator or the like. The cured coating film of the silicone for release paper has excellent release properties and appropriate flexibility.

When the silicone for release paper having such properties is used as the silicone resin layer of the present invention, a silicone resin layer having appropriate flexibility and having releasability and non-adhesive properties can be obtained.

The silicone for release paper can be classified by the curing mechanism into a condensation reaction silicone, an addition reaction silicone, an ultraviolet-curable silicone and an electron beam-curable silicone. Any of these can be used in the present invention. However, most preferred is an addition reaction silicone from such a viewpoint that the curing reaction is easily carried out, and a silicone resin layer of the present invention is easily formed when the cured coating film is formed, and from the viewpoint of heat resistance of the cured product. Further, it is possible to ascertain to some extent whether or not the silicone for release paper is contained in the resin layer by IR (infrared spectroscopy) or from the strength or adhesive property of the resin layer.

The addition reaction silicone comprises the chief agent made of a linear polyorganosiloxane having vinyl groups at both terminals and/or in its side chain, and a crosslinking agent made of methylhydrogen polysiloxane having hydrosilyl groups in its molecule, and it undergoes a heat curing reaction in the presence of a platinum catalyst.

The linear polyorganosiloxane having vinyl groups at both terminals and/or in its side chain, is a compound which can be represented by either one of the following formulae.

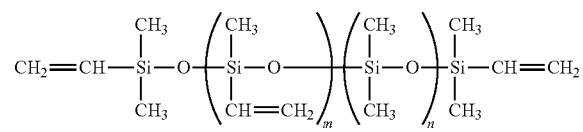

wherein each of m and n is an integer and may be 0. When m is 0, the linear polyorganosiloxane will have vinyl groups at both terminals. When m is an integer of at least 1, the linear polyorganosiloxane will have vinyl groups at both terminals and in its side chain.

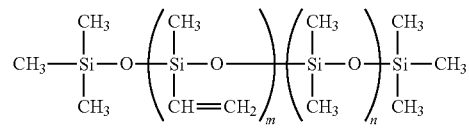

wherein m in the formula is an integer of at least 2, and n is an integer and may be 0. In such a case, the linear polyorganosiloxane will have vinyl groups in its side chain.

The methylhydrogen polysiloxane having hydrosilyl groups in its molecule is a compound represented by the following formula.

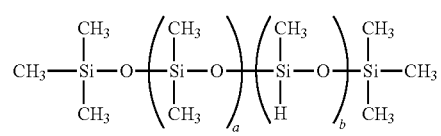

wherein a in the formula is an integer, and b is an integer of at least 1.

Further, a part of methyl groups at a terminal of the methylhydrogen polysiloxane may be a hydrogen atom or a hydroxyl group.

In the addition reaction silicone, the chief agent made of the linear polyorganosiloxane having vinyl groups at both terminals and/or in its side chain, and a crosslinking agent made of methylhydrogen polysiloxane having hydrosilyl groups in its molecule, is such that the molar ratio of the hydrosilyl groups to the vinyl groups is preferably from 0.7/1 to 1.3/1, particularly preferably from 0.8/1 to 1.2/1.

If the molar ratio of the hydrosilyl groups to the vinyl groups exceeds 1.3/1, the peeling force after the heat treatment increases, and the removability may be deteriorated. Further, if the molar ratio of the hydrosilyl groups to the vinyl groups is less than 0.7/1, the crosslink density of a cured product decreases, whereby the chemical resistance, etc., may have a problem. The reason why the peeling force after the heating treatment increases when the molar ratio of the hydrosilyl groups to the vinyl groups exceeds 1.3/1, is not apparent, but it is considered that some kind of reaction between unreacted hydrosilyl groups in the cured product and silanol groups at the glass surface, by the heating treatment, is involved.

The catalyst to be used for heat curing reaction is preferably a platinum catalyst, and as the platinum catalyst, a known one may be used. Specifically, it may, for example, be chloroplatinic acid such as tetrachloroplatinic(II) acid or hexachloroplatinic(IV) acid, an alcohol compound of chloroplatinic acid, an aldehyde compound or a complex salt of chloroplatinic acid with an olefin.

The amount of the platinum catalyst used is preferably from 0.1 to 20 parts by mass, more preferably from 1 to 10 parts by mass, per 100 parts by mass of the silicone for release paper.

The structures of silicone for release paper to be used for forming a silicone resin layer having releasability and non-adhesive property and to be used for forming a silicone resin layer having releasability and slight adhesive property, are not substantially different. Specifically, depending on the level of the crosslink density in a resin cured product to be obtained by heat-curing the silicone for release paper, a silicone resin layer may be separated into a case of having releasability and non-adhesive property or into a case of having releasability and slight adhesive property. More specifically, when the crosslink density in a resin cured product is large, a resin cured product will have adhesive property.

From such a viewpoint, it may be said that in the above linear polyorganosiloxane, when vinyl groups contained in its side chain increase, a resin cured product to be obtained will have adhesive property.

The silicone for release paper may be a solvent, emulsion or solventless form, and any form can be used. However, in view of productivity, safety and environmental properties, the solventless form is preferred. In the case of using the solventless form, bubbles are less likely to remain in the resin layer since a solvent which causes bubbles at the time of heat curing, ultraviolet curing or electron beam curing is not contained.

The silicone resin layer of the present invention may be formed by only one silicone for release paper or may be formed by two or more silicones for release paper. In a case where it is formed by two or more silicones for release paper, it may be a silicone resin layer having a multilayer structure in which the two or more silicones for release paper are laminated with each other, or may be a mixed silicone resin layer containing the two or more silicones for release paper in one layer.

With respect to the silicone resin layer of the present invention, it is preferred that components in the silicone resin layer are less likely to migrate to the glass substrate when the glass substrates are separated, that is, the resin layer preferably has low silicone migration property.

The degree of easiness of migration of components in the silicone resin layer, can be judged by employing the residual adhesion ratio of the silicone resin layer as an index. The residual adhesion ratio of the silicone resin layer can be measured by the following method.

Method for Measuring Residual Adhesion Ratio

A standard adhesive tape (CELLOTAPE (trade mark) CT405A-15 (manufactured by NICHIBAN Co., Ltd.)) with a width of 15 mm is bonded to the surface of the silicone resin layer manually and heated at 70° C. for 20 hours in the air. After a lapse of 20 hours, the standard adhesive tape is peeled from the silicone resin layer. The peeled standard adhesive tape is bonded to the surface of a clean glass substrate (e.g. AN100 (manufactured by Asahi Glass Company, Limited)), and then the 180° peel strength (300 mm/min) is measured (peel strength (A)).

The same standard adhesive tape as above is bonded to the surface of a clean glass substrate (e.g. AN100 (manufactured by Asahi Glass Company, Limited)) manually and then left at room temperature in the air for 20 hours. After a lapse of 20 hours, the standard adhesive tape is peeled from the surface of the glass substrate. The peeled standard adhesive tape is bonded to the surface of a glass substrate (e.g. AN100 (manufactured by Asahi Glass Company, Limited)), and the 180° peel strength (300 mm/min) is measured (peel strength (B)).

The residual adhesion ratio is determined from the following formula. Further, when there is no migration whatsoever, the residual adhesion ratio is 100%.

$$\text{Residual adhesion ratio}(\%) = \text{peel strength}(A)/\text{peel strength}(B) \times 100$$

The silicone resin layer of the present invention preferably has a residual adhesion ratio obtained by the above measuring method of at least 95%, more preferably at least 98%. When the residual adhesion ratio is at least 95%, it is considered that migration of components in the resin layer from the silicone resin layer to the glass substrate surface is very low. Therefore, since components in the silicone resin layer are less likely to migrate to the surface of the glass substrate after separation, bonding failure or the like is less likely occur when a polarizing plate or the like is bonded to the surface of glass substrate.

To obtain a silicone resin layer having low silicone migration property, a silicone for release paper containing no components having high migration properties may be used. A non-reactive silicone is blended in some cases so that the silicone for release paper has releasability. In such a case, as the non-reactive silicone, a linear dimethylpolysiloxane having a very high molecular weight or a relatively low molecular weight linear dimethylpolysiloxane having compatibility with the cured coating film lowered by introducing a phenyl group or a higher alkyl group, is used. Since such a non-reactive silicone is a component having high migration property, the silicone for release paper used in the present invention preferably has a non-reactive silicone content of at most 5 mass %, and it more preferably contains substantially no non-reactive silicone.

In the present invention, specifically, a suitable silicone for release paper may, for example, be KNS-320A, KS-847 (each manufactured by Shin-Etsu Silicones), TPR6700 (manufactured by GE Toshiba Silicone), a combination of vinyl silicone "8500" (manufactured by Arakawa Chemical Industries, Ltd.) and methylhydrogen polysiloxane "12031" (manufactured by Arakawa Chemical Industries, Ltd.), a combination of vinyl silicone "11364" (manufactured by Arakawa Chemical Industries, Ltd.) and methylhydrogen polysiloxane "12031" (manufactured by Arakawa Chemical Industries, Ltd.), or a combination of vinyl silicone "11365" (manufactured by Arakawa Chemical Industries, Ltd.) and methylhydrogen polysiloxane "12031" (manufactured by Arakawa Chemical Industries, Ltd.).

The suitable thickness of a resin layer having removability, which includes the above silicone resin layer, is controlled by a thinner thickness between the glass substrate and the protective glass substrate. As the substrate thickness increases, the boding strength of the resin layer to both substrates decreases, whereby in order to secure sufficient bonding strength to both substrates, the resin layer is needed to be thickened. Further, the most preferred thickness of the resin layer may vary depending on the level of flexibility or adhesive property of the resin layer to be used.

In general, the thickness of the resin layer having removability is preferably from 1 to 100 µm. If the thickness of the resin layer is thinner than 1 µm, the bonding strength of the resin layer to both substrates may be insufficient. Further, when foreign matters are included, convex defects are likely to form. On the other hand, when the thickness exceeds 100 µm, it takes time for curing of the resin, such being economically disadvantageous.

The thickness of a resin having removability is more preferably from 5 to 30 µm. When the thickness of the resin layer is from 5 to 30 µm, even if thicknesses of the glass substrate and the protective glass substrate are large, for example, the thickness of the thinner substrate between the glass substrate and the protective glass substrate is at least 0.5 mm, the bonding strength of the resin layer to both substrates will unlikely be insufficient. The thickness of the resin layer having removability is further preferably from 15 to 30

A process for forming the resin layer having removability on the protective glass substrate is not particularly limited, and it is suitably selected from known methods. When the silicone for release paper is used for the resin layer having removability, the silicone for release paper is applied on a surface of the protective glass substrate, and then the silicone for release paper is cured before glass is laminated.

As a method of applying the silicone for release paper, a known method may be used. Specifically, it may, for example, be a spray coating method, a die coating method, a spin coating method, a dip coating method, a roll coating method, a bar coating method, a screen printing method or a gravure coating method. Such a coating method can properly be selected depending upon the type of the silicone for release paper. For example, in a case where the silicone for release paper is a solventless type, the die coating method, the spin coating method or the screen printing method is suitable. Among them, the screen printing method is preferred for a reason that the yield of a liquid is suitable, and it is possible to form a resin layer in a uniform thickness over the entire surface of the glass substrate.

In a case where the silicone for release paper is a solventless type, its amount to be applied is preferably from 1 g/m$^2$ to 100 g/m$^2$.

In the case of an addition reaction silicone, a mixture of the silicone for release paper containing the chief agent and the crosslinking agent, with a catalyst, is applied on the protective glass substrate by any one of the above methods, and then heat-cured. The heat-curing conditions vary depending upon the amount of the catalyst blended, and for example, when 2 parts by mass of a platinum catalyst is blended per 100 parts by mass of the silicone for release paper, the mixture is heat-cured in atmosphere at a temperature of from 50° C. to 250° C., preferably from 100° C. to 200° C. for from 5 to 60 minutes, preferably from 10 to 30 minutes.

In order to obtain a silicone resin layer having low silicone migration property, it is preferred that the curing reaction proceeds as far as possible so that unreacted silicone components will not remain in the silicone resin layer. By heat-curing under the above condition, unreacted silicone components will not remain in the silicone resin layer. If the heating time is too long, or if the heating temperature is too high as compared with the above conditions, oxidative decomposition of the silicone resin will take place simultaneously, and low molecular weight silicone components will form, thus increasing the silicone migration property.

Thus, it is preferred that the curing reaction proceeds as far as possible so that unreacted silicone components will not remain in the silicone resin layer, also to obtain favorable releasability after heat treatment.

The shape of a resin layer to be formed on the protective glass substrate is not particularly limited as long as the glass substrate is not displaced from the protective glass substrate when the production process for a display device is carried out by using the glass substrate with protective glass. Therefore, it is not necessary to form the resin layer on the entire surface of the protective glass substrate, and the resin layer may be formed on a part of the surface of the protective glass substrate. However, if the resin layer is formed at a random position on the surface of the protective glass substrate, the bonding strength of the resin layer to the glass substrate may be deteriorated. Further, in a state where the glass substrate is laminated on the resin layer-formed surface of the protective glass, if there is a space in the resin layer when the laminate is viewed from a side, it is not possible to use a vacuum lamination method or a vacuum pressing method. Therefore, when the resin layer is formed on a part of the surface of the protective glass substrate, it is preferred to form the resin layer so that the resin layer has a circular form (a doughnut-like circular form) having some width, on the surface of the protective glass substrate. In a case where such a resin layer is formed, when the silicone for release paper is used for the resin layer having removability, the silicone for release paper may be screen-printed in a dot form as to draw a circle having some width, on the surface of the protective glass substrate.

After the resin layer having removability is formed on the protective glass substrate, the glass substrate is laminated on the resin layer-formed surface of the protective glass substrate. When the silicone for release paper is used for the resin layer having removability, the silicone for release paper applied on the protective glass substrate is heat-cured to form a silicone resin layer, and then, the glass substrate is laminated on the silicone resin-formed surface of the protective glass substrate. More specifically, they are laminated so that the resin layer-formed surface of the protective glass substrate and the back surface of the glass substrate face each other.

By heat-curing the silicone for release paper, a silicone resin cured product will be chemically bonded to the protective glass substrate, and by an anchor effect, the silicone resin layer will be bonded to the protective glass substrate. By these actions, the silicone resin layer is "fixed" on the protective glass substrate. Further, when the glass substrate is subjected to lamination after the heat-curing, such a glass substrate can easily be peeled.

The procedure to laminate the glass substrate on the surface of the protective glass substrate with the resin having removability formed, can be carried out by using a known process. For example, in a normal pressure environment, the glass substrate is laminated on the resin-formed surface, and then, the laminate may be pressure bonded by using rolls or a press. By pressure bonding by rolls or a press, the resin layer and the glass substrate are more closely bonded to each other. Further, by pressure bonding by rolls or a press, the bubbles included in the resin layer can easily be removed.

However, from the viewpoint of suppressing inclusion of bubbles or securing suitable bonding, it is preferred to use a vacuum lamination method or a vacuum pressing method. By laminating in a vacuum atmosphere, even if very small bubbles remain, the bubbles will not grow by heating, whereby convex defects of the glass substrate less likely to form.

When the glass substrate is to be laminated on the resin layer-formed surface of the protective glass substrate, it is necessary to sufficiently clean the surface of the glass substrate and to laminate it in an environment of a high cleanness.

Extremely small foreign matters may be absorbed in the resin layer by deformation of the resin layer having flexibility, and they may not influence the bonding property of the surface of the glass substrate with protective glass after the lamination. However, depending on their amounts or sizes, the bonding property of the laminate may be deteriorated.

Now, the process for producing a display device of the present invention will be described. In the process for producing a display device of the present invention, after the glass substrate with protective glass of the present invention is formed by the above procedure, prescribed treatment to produce a display device on the glass substrate of the glass substrate with protective glass is carried out. In the present specification, prescribed treatment to produce a display device, widely includes various treatments carried out in the production process when a display device such as an LCD or an OLED is produced. Specific examples of treatments carried out include, with reference to production of an LCD as an example, a step of forming an array on the glass substrate, a step of forming a color filter on a glass substrate different from the above glass substrate, a step of bonding the glass substrate on which the array is formed and the glass substrate on which the color filter is formed (an array/color filter bonding step). As a treatment carried out in these steps, specifically, for example, washing with pure water, drying, film deposition, resist coating, exposure, developing, etching and removal of resist may, for example, be mentioned. Further, as a step carried out after the array/color filter bonding step, a step of reduction in thickness of the glass substrate by a chemical etching treatment, a liquid crystal injection step and a step of sealing the inlet carried out after the treatment may be mentioned, and treatment carried out in these steps is also included.

However, all of these treatments do not need to be carried out in a state of the glass substrate with protective glass. For example, from the viewpoint of handling efficiency, it is preferred that until the array/color filter bonding step, the respective steps are carried out in a state of the glass substrate with protective glass, and then, after separating the glass substrate from the back surface of the protective glass substrate, the liquid crystal injection step is carried out. Further, when the chemical etching treatment is carried out after the array/color filter bonding step is carried out, the glass substrate and the back surface of the protective glass substrate need to be separated before the chemical etching treatment is carried out.

Here, in the process for producing a display device of the present invention, both of a glass substrate on which an array is to be formed and a glass substrate on which a color filter is to be formed, may not be a glass substrate with protective glass. For example, it is possible to bond a glass substrate with protective glass on which an array is formed and an ordinary glass substrate on which a color filter is formed, or it is possible to bond an ordinary glass substrate on which an array is formed and a glass substrate with protective glass on which a color filter is formed.

Further, with reference to production of an OLED as an example, steps of forming an organic EL structure on the glass substrate with protective glass include various steps such as a step of forming a transparent electrode, a step of evaporating a hole injection layer, a hole transport layer, an electroluminescence layer, an electron transport layer, etc., and a sealing step, and as treatments carried out in these steps, specifically, for example, film deposition treatment, evaporation treatment and treatment to bond a sealing plate may be mentioned.

After the above prescribed treatment is carried out, the glass substrate and the protective glass substrate are separated. The separation may be carried out by peeling manually, but it is possible to more easily carry out peeling by providing a start of peeling at the edge portion by e.g. a blade of a razor or by injecting air into the interface of the laminate. On the peeled protective glass substrate, the resin layer having removability is still present as it was formed, whereby it is possible to use the protective glass substrate again, for a laminate with another glass substrate.

After the glass substrate and the protective glass substrate are separated, a display device having a glass substrate can be obtained via required and desired steps. The steps carried out include, in the case of an LCD, for example, a step of reduction in thickness of the glass substrate by a chemical etching treatment, a separation step into cells having a desired size, a step of injecting liquid crystal and then sealing the inlet, a step of bonding a polarizing plate and a module forming step. In the case of an OLED, in addition to these steps, a step of assembling the glass substrate on which an organic EL structure is formed and an opposing substrate, is included.

Further, the present invention also provides silicone for release paper, which is used for lamination of the protective glass substrate and the glass substrate, and which is for the glass substrate with protective glass.

EXAMPLES

Example 1

The protective glass substrate (AN100, manufactured by Asahi Glass Company, Limited) having 400 mm×300 mm×0.3 mm thick and having a linear expansion coefficient of $38×10^{-7}/°$ C., was cleaned by e.g. purified water washing and UV washing, and then, a mixed product (application amount 30 g/m$^2$) of 100 parts by mass of a non-solvent addition reaction type silicone for release paper (KNS-320A, viscosity: 400 cs, manufactured by Shin-Etsu Silicone) and 2 parts by mass of a platinum type catalyst (CAT-PL-56, manufactured by Shin-Etsu Silicone), was applied on the above protective glass substrate by a screen printing machine, and was heat-cured at 180° C. for 30 mins in the atmospheric air to obtain a silicone resin layer of 20 μm thick.

A surface of a glass substrate (AN100, manufactured by Asahi Glass Company, Limited) having 400 mm×300 mm×0.4 mm thick and having a linear expansion coefficient of $38×10^{-7}/°$ C., which is to be contacted with the silicone resin layer, was cleaned by e.g. purified water washing, and UV washing, and then, a silicone-resin-layer-formed surface of the protective glass substrate and the glass substrate were laminated by a vacuum press at room temperature, to obtain a glass substrate with protective glass (a glass substrate 1 with protective glass) of the present invention. FIG. 1 is a cross-sectional view of the glass substrate 1 with protective glass obtained in such a manner. As shown in FIG. 1, the glass substrate 1 with protective glass comprises a glass substrate 11 and a protective glass substrate 12 laminated on each other by a silicone resin layer 13.

In the glass substrate 1 with protective glass, the glass substrate 11 is bonded to the silicone resin layer 13 without having formation of bubbles, and it had no convex defects and had suitable smoothness.

The formed glass substrate 1 with protective glass was evaluated as follows.
(1) Simple Peel Test The glass substrate 1 with protective glass was set so that the glass substrate 11 became upside, and the glass substrate 11 was fixed by using a jig. With such a state, the protective glass substrate 12 was peeled downward manually, and it was easily peeled. Further, with respect to the glass substrate 1 with protective glass after it was heat treated at 300° C. for 1 hour in an atmosphere, the peel test was also carried out, and the protective glass substrate 12 was easily peeled and had suitable heat resistance.
(2) Peel Test (1) (Before Heating)

Figure 2:
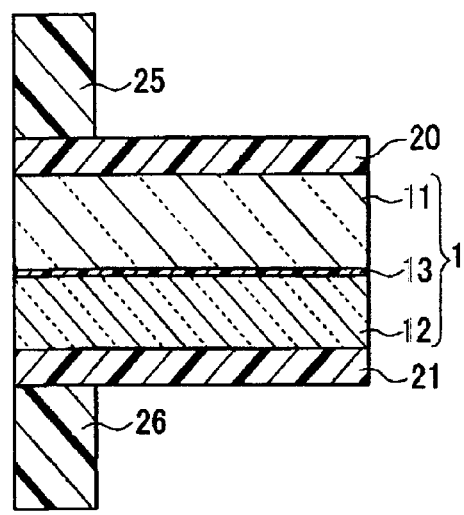
FIG. 2 is a cross-sectional schematic view illustrating the relation between a jig and the glass substrate with protective glass 1 shown in FIG. 1, during a peel test (1).

A test was carried out by a jig shown in FIG. 2. Further, for convenience of a Figure, the side length of the jig is shown shorter than the actual one.

The glass substrate 1 with protective glass was cut into a size of 50 mm×50 mm, and on surfaces of both glass substrates (the glass substrate 11 and the protective glass substrate 12) of the glass substrate 1 with protective glass, polycarbonate members 20 and 21, having 50 mm×50 mm×5 mm thick were bonded with an adhesive for epoxy two-pack glass. Further, on each surface of the polycarbonate members 20 and 21 bonded on glass substrates, each of polycarbonate members 25 and 26, having 50 mm×50 mm×5 mm thick, was bonded. The position where each of the polycarbonate members 25 and 26 bonded was, as shown in FIG. 2, at the most left end of each polycarbonate members 20 and 21 in a horizontal direction, and at a parallel position is each polycarbonate members 20 and 21 in a vertical direction.

The glass substrate 1 with protective glass having polycarbonate members 20, 21 and 25, 26 bonded thereon, was set as to have the protective glass substrate 12 downside. The polycarbonate member 25 on a side of the glass substrate 11 was fixed, and when the polycarbonate member 26 on a side of the protective glass substrate 12 was peeled downward in a perpendicular direction at a rate of 300 mm/min, the protective glass substrate 12 was peeled when a load of 13.8 kg wt (0.55 kg wt/cm$^2$) was applied. No breakage was formed on the protective glass substrate 12 or the glass substrate 11.

(3) Peel Test (1) (After Heating)

A peel test (1) (after heating) was carried out in the same manner as in the peel test (1) (before heating) except that instead of using the glass substrate 1 with protective glass in the peel test (1) (before heating), a glass substrate 1 with protective glass after being heat-treated at 300° C. for 1 hour in an atmosphere after lamination was used. The protective glass substrate 12 was peeled when a load of 45 kg wt (1.8 kg wt/cm$^2$) was applied. No breakage was formed on the protective glass substrate 12 or the glass substrate 11.

Further, this heat treatment is almost the same as the heat treatment which is carried out when liquid crystal is formed.

(4) Shear Strength Test

Figure 3:
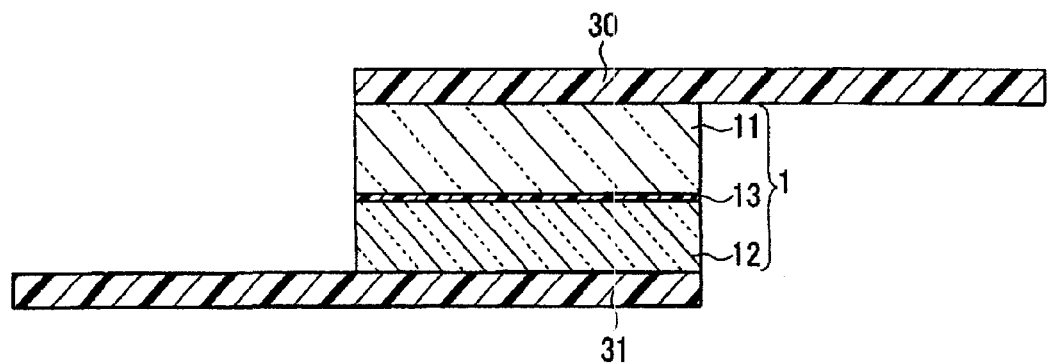
FIG. 3 is a cross-sectional schematic view illustrating the relation between a jig and the glass substrate with protective glass 1 shown in FIG. 1 during a shear strength test.

A test was carried out by a jig shown in FIG. 3. Further, for convenience of the Figure, the side length of the jig is shown shorter than the actual one.

The glass substrate 1 with protective glass was cut into a size of 25 mm×25 mm, and on surfaces of both glass substrates (the glass substrates 11 and 12) of the glass substrate 1 with protective glass, polycarbonate members 30 and 31, having 25 mm×50 mm×3 mm thick were bonded with an epoxy two-pack adhesive for glass. The area for bonding was set as 25 mm×25 mm. Further, the areas for bonding were an area covering the protective glass substrate 12 and a right half portion of the polycarbonate member 31, and an area covering the glass substrate 11 and a left half portion of the polycarbonate member 30.

The polycarbonate member 30 bonded on the glass substrate 11 was fixed, and the polycarbonate member 31 bonded on the protective glass substrate 12 was pulled at a pulling rate of 0.5 mm/min in a lateral direction in FIG. 3 (in a length direction of the polycarbonate members 30 and 31). The protective glass substrate 12 was peeled when a load of 13 kg wt (2.1 kg wt/cm$^2$) was applied. No breakage was formed on the protective glass substrate 12 or the glass substrate 11. Further, the shear strength test was carried out with respect to the glass substrate 1 with protective glass after being heat-treated at 300° C. for 1 hour in an atmosphere after lamination, but the same value was obtained.

(5) Measuring Residual Adhesion Ratio

By using the measuring method described in the above "method for measuring residual adhesion ratio", the residual adhesion ratio of a silicone resin layer formed by the above procedures, was measured, and the residual adhesion ratio was 106%.

Example 2

The glass substrate with protective glass (a glass substrate 2 with protective glass) of the present invention was obtained by carrying out the same procedures as in Example 1 except that the substrate thickness of the protective glass substrate was 0.4 mm.

In the glass substrate 2 with protective glass, the glass substrate was bonded to the silicone resin layer without forming bubbles, and it had no convex defects and had suitable smoothness.

When the simple peel test was carried out on the glass substrate 2 with protective glass, it was easy to peel the back surface protective glass substrate. Further, with respect to the glass substrate 2 with protective glass after being heat-treated at 300° C. for 1 hour in an atmosphere, the simple peel test was carried out, and it was easy to peel the back surface protective glass substrate, and the heat resistance was also suitable.

Further, in the same manner as in Example 1, with respect to the glass substrate 2 with protective glass, the peel test (1) (before heating), peel test (1) (after heating) and the shear strength test were carried out, and in each test, the protective glass substrate was peeled when a load of 13.8 kg wt (0.55 kg wt/cm$^2$), a load of 45 kg wt (1.8 kg wt/cm$^2$) and a load of 13 kg wt (2.1 kg wt/cm$^2$) were applied, respectively.

In the same manner as in Example 1, the residual adhesion ratio of the silicone resin layer formed by the above procedures, was measured, and the residual adhesion ratio was 106%.

Example 3

The protective glass substrate (AN100, manufactured by Asahi Glass Company, Limited) having 400 mm×300 mm×0.2 mm thick and having a linear expansion coefficient of 38×10$^{-7}$/° C. was cleaned by e.g. purified water washing and UV washing, and then, a mixed product (application amount 20 g/m$^2$) of a linear polyorganosiloxane having vinyl groups at both terminals (tradename "8500", manufactured by Arakawa Chemical Industries, Ltd.), methylhydrogen polysiloxane having hydrosilyl groups in its molecule (tradename "12031" manufactured by Arakawa Chemical Industries, Ltd.), and a platinum catalyst (tradename CAT12070", manufactured by Arakawa Chemical Industries, Ltd.), was applied on the above protective glass substrate by a screen printing machine, and was heat-cured at 180° C. for 30 minutes in an atmosphere to obtain a silicone resin layer of 20 μm thick.

Here, the mixing ratio of the linear polyorganosiloxane to methylhydrogen polysiloxane was adjusted so that the molar ratio of the hydrosilyl groups to the vinyl groups became 1/1. The platinum catalyst was added in an amount of 5 pacts by mass per 100 parts by mass of the total of the linear polyorganosiloxane and methylhydrogen polysiloxane.

The glass substrate (AN100, manufactured by Asahi Glass Company, Limited) having 400 mm×300 mm×0.5 mm thick and having a linear expansion coefficient of 38×10$^{-7}$/° C. had its surface to be contacted with the silicone resin layer, cleaned by e.g. purified water washing and UV washing, and then, the silicone resin layer-formed surface of the protective glass substrate and the glass substrate were bonded to each other at room temperature by vacuum pressing to obtain the glass substrate with protective glass (a glass substrate 3 with protective glass) of the present invention.

In the glass substrate 3 with protective glass, the glass substrate was bonded to the silicone resin layer without forming bubbles, and it had no convex defects and had suitable smoothness.

When the simple peel test was carried out on the glass substrate 3 with protective glass, it was easy to peel the protective glass substrate. Further, with respect to the glass substrate 3 with protective glass after being heat-treated at 300° C. for 1 hour in an atmosphere, the simple peel test was carried out, and it was easy to peel the protective glass substrate, and the heat resistance was also suitable.

Further, in the same manner as in Example 1, with respect to the glass substrate 3 with protective glass, the peel test (1) (before heating), the peel test (1) (after heating) and the shear strength test were carried out, and in each test, the protective glass substrate was peeled when a load of 12 kg wt (0.47 kg wt/cm$^2$), a load of 12 kg wt (0.47 kg wt/cm$^2$) and a load of 12 kg wt (1.9 kg wt/cm$^2$), were applied, respectively.

In the same manner as in Example 1, the residual adhesion ratio of the silicone resin layer formed by the above procedures, and the residual adhesion ratio was 105%.

Example 4

A glass substrate with protective glass (a glass substrate 4 with protective glass) was obtained by carrying out the same procedures as Example 3 except that the substrate thickness of the protective glass was adjusted as 0.4 mm, and that the substrate thickness of the glass substrate was adjusted as 0.7 mm.

In the glass substrate 4 with protective glass, the glass substrate was bonded with the silicone resin layer without forming bubbles, and it had no convex defects and had suitable smoothness.

When the simple peel test was carried out on the glass substrate 4 with protective glass substrate, it was easy to peel the protective glass substrate. Further, with respect to the glass substrate 4 with protective glass after being heat treated at 300° C. for 1 hour in an atmosphere, the simple peel test was carried out, and it was easy to peel the protective glass substrate, and the heat resistance was also suitable.

Further, in the same manner as in Example 1, with respect to the glass substrate 4 with protective glass, the peel test (1) (before heating), peel test (1) (after heating) and the shear strength test were carried out, and in each test, the protective glass substrate was peeled when a load of 12.0 kg wt (0.47 kg wt/cm$^2$), a load of 12 kg wt (0.47 kg wt/cm$^2$) and a load of 12 kg wt (1.9 kg wt/cm$^2$) were applied, respectively.

In the same manner as in Example 1, the residual adhesion ratio of the silicone resin layer formed by the above procedures, was measured, and the residual adhesion ratio was 105%.

Example 5

In this Example of the present invention, an LCD is produced by using the glass substrate 1 with protective glass obtained in Example 1. Two glass substrates 1 with protective glass are prepared, and a step for forming an array is carried out for one of them to form an array on a surface of the glass substrate. For the other one, a step for forming a color filter is carried out to form a color filter on a surface of the glass substrate. The glass substrate 1 with protective glass on which an array is formed, and the glass substrate 1 with protective glass on which a color filter is formed, are bonded to each other, and then, a start for peeling is provided at the edge portion by a blade of a razor, and each protective glass substrate is separated. On the surface of the glass substrate after the separation, there are no scratches which might lead to a strength decrease. Then, the glass substrate is cut and segmentalized into 28 cells having 51 mm×38 mm, and then, a liquid crystal injection step and a step of sealing the injection inlet are carried out to form liquid crystal cells. For formed liquid crystal cells, a step of attaching a polarizing plate is carried out, and continuously, a module formation step is carried out to obtain an LCD. The LCD obtained in such a manner has no problem with respect to its characteristics.

Example 6

In this Example of the present invention, an LCD is produced by using the glass substrate 3 with protective glass obtained in Example 3. Two glass substrates 3 with protective glass are prepared, and a step for forming an array is carried out for one of them to form an array on a surface of the glass substrate. For the other one, a step for forming a color filter is carried out to form a color filter on a surface of the glass substrate. The glass substrate 3 with protective glass on which an array is formed, and the glass substrate 3 with protective glass on which a color filter is formed, are bonded to each other, and then, a start for peeling is provided at the edge portion by a blade of a razor, and each protective glass substrate is separated. On the surface of the glass substrate after the separation, there are no scratches which might lead to a strength decrease. Then, by a chemical etching treatment, each thickness of the glass substrates is adjusted as 0.3 mm. On the surface of the glass substrate after the chemical etching treatment, there is no formation of etch pits which might be an optically problem. After that, the glass substrate is cut and segmentalized into 28 cells having 51 mm×38 mm, and then, a liquid crystal injection step and a step of sealing the injection inlet are carried out to form a liquid crystal cell. For formed liquid crystal cells, a step of attaching a polarizing plate is carried out, and continuously, a module formation step is carried out to obtain an LCD. The LCD obtained in such a manner has no problem with respect to its characteristics.

Example 7

In this example of the present invention, the glass substrate 2 with protective glass obtained in Example 2 and an alkali-free glass substrate having a thickness of 0.7 mm are used to produce an LCD. The glass substrate 2 with protective glass is prepared, and a step of forming a color filter is carried out to form a color filter on a surface of the glass substrate 2 with protective glass. On the other hand, for the alkali-free glass substrate (AN-100, manufactured by Asahi Glass Company, Limited) having a thickness of 0.7 mm, a step of forming an array is carried out to form an array on a surface of the alkali-free glass substrate having a thickness of 0.7 mm. The glass substrate 2 with protective glass on which a color filter is formed, and the alkali-free glass substrate having a thickness of 0.7 mm, on which an array is formed, are bonded to each other, and then, a start for peeling is provided at the edge portion by a blade of a razor, whereby the protective glass substrate is separated from the glass substrate 2 with protective glass. On the surface of the glass substrate after the separation, there are no scratches which might lead to a strength decrease. Then, a glass substrate/alkali-free glass substrate attachment is segmentalized into 28 cells having 51 mm×38 mm by a razor cutter or scrub/break method. And then, a liquid crystal injection step and a step of sealing the inlet are carried out to form liquid crystal cells. For formed liquid crystal cells, a step of attaching a polarizing plate is carried out, and continuously, a module formation step is carried out to obtain an LCD. The LCD obtained in such a manner has no problem with respect to its characteristics.

Example 8

In this Example of the present invention, by using the glass substrate 3 with protective glass obtained in Example 3, an OLED is produced. By carrying out a step of forming a transparent electrode, a step for forming an auxiliary electrode, a step of vapor depositing a hole injection layer, a hole transport layer, a luminous layer, an electron transport layer, etc., and a step of sealing them, an organic EL structure is formed on the glass substrate of the glass substrate 3 with protective glass. Then, the protective glass substrate is separated. On the surface of the glass substrate after the separation, there are no scratches which might lead to a strength decrease. Then, the glass substrate is cut by using a razor cutter or a scrub/break method, and segmentalized into 40 cells having 41 mm×30 mm, and then, the glass substrate on which the organic EL structure is formed, and the facing substrate, are assembled, and a module formation step was carried out to produce an OLED. The OLED obtained in such a manner has no problem with respect to its characteristics.

Comparative Example 1

An LCD is obtained by carrying out the same procedures as Example 5 except that instead of the glass substrate 1 with protective glass, a glass substrate (AN100, manufactured by Asahi Glass Company, Limited) having 400 mm×300 mm×0.4 mm thick and having a linear expansion coefficient of $38\times10^{-7}/°$ C., is used.

On the surface of the glass substrate after the array/color filter bonding step, many scratches are formed, which might lead to a strength decrease.

Comparative Example 2

An LCD is obtained by carrying out the same procedures as Example 6 except that instead of the glass substrate 3 with protective glass, a glass substrate (AN100, manufactured by Asahi Glass Company, Limited) having 400 mm×300 mm×0.5 mm thick and having a linear expansion coefficient of $38\times10^{-7}/°$ C., is used.

On the surface of the glass substrate after the array/color filter bonding step, many scratches are formed, which might lead to a strength decrease. Further, on the surface of the glass substrate after a chemical etching treatment, there is formation of etch pits having a depth of 20 μm, which are recognized as optical defects.

INDUSTRIAL APPLICABILITY

The glass substrate with protective glass obtained by the present invention, may be used as a glass substrate for various display devices.

The entire disclosure of Japanese Patent Application No. 2006-191388 filed on Jul. 12, 2006 including specification, claims, drawings and summary is incorporated herein by reference in its entirety.

The invention claimed is:

1. A process for producing a display device by using a glass substrate with protective glass, the process comprising:
    forming a resin layer, which is releasable and non-adhesive or slightly adhesive, on a protective glass substrate,
    laminating a glass substrate on a surface of the releasable and non-adhesive resin layer formed on the protective glass substrate by a force resulting only from Van der Waals force,
    carrying out a prescribed treatment for producing a display device on the glass substrate, and
    separating the glass substrate from the protective glass substrate.

2. The process for producing a display device by using a glass substrate with protective glass according to claim 1, wherein the resin layer is at least one layer selected from the group consisting of an acrylic resin layer, a polyolefin resin layer, a polyurethane resin layer, a silicone resin layer, and a mixture thereof.

3. The process for producing a display device by using a glass substrate with protective glass according to claim 2, wherein the resin layer is a silicone resin layer.

4. The process for producing a display device by using a glass substrate with protective glass according to claim 3, wherein the silicone resin layer is a layer made of a cured product of silicone for release paper.

5. The process for producing a display device by using a glass substrate with protective glass according to claim 4, wherein the cured product of silicone for release paper, is a crosslinked product of a linear polyorganosiloxane having vinyl groups at both terminals and/or in its side chain, and a methylhydrogen polysiloxane having at least one hydrosilyl group in its molecule.

6. The process for producing a display device by using a glass substrate with protective glass according to claim 5, wherein before curing, the cured product of silicone for release paper has a molar ratio of hydrosilyl groups of the methylhydrogen polysiloxane to vinyl groups of the linear polyorganosiloxane of from 1.3/1 to 0.7/1.

7. The process for producing a display device by using a glass substrate with protective glass according to claim 1, wherein the forming of a resin layer on the protective glass substrate comprises applying silicone for release paper on the protective glass substrate, followed by curing the silicone for release paper.

8. The process for producing a display device by using a glass substrate with protective glass according to claim 7, wherein the silicone for release paper comprises a linear polyorganosiloxane having vinyl groups at both terminals and/or in its side chain, a methylhydrogen polysiloxane having at least one hydrosilyl group in its molecule, and a platinum catalyst.

9. The process for producing a display device by using a glass substrate with protective glass according to claim 8, wherein in the silicone for release paper, the molar ratio of hydrosilyl groups of the methylhydrogen polysiloxane to vinyl groups of the linear polyorganosiloxane is from 1.3/1 to 0.7/1.

10. The process for producing a display device by using a glass substrate with protective glass according to claim 7, wherein the silicone for release paper comprises substantially no non-reactive silicone.

11. The process for producing a display device by using a glass substrate with protective glass according to claim 7, wherein the application of the silicone for release paper is carried out by at least one method selected from the group consisting of a die coating method, a spin coating method, and a screen printing method.

12. The process for producing a display device by using a glass substrate with protective glass according to claim 7, wherein the silicone for release paper is heat-cured at a temperature of from 50 to 250° C.

13. The process for producing a display device by using a glass substrate with protective glass according to claim 1, wherein the lamination of a glass substrate on the surface of the releasable and non-adhesive or slightly adhesive resin layer is carried out by vacuum pressing or vacuum lamination.

14. The process for producing a display device by using a glass substrate with protective glass according to claim 1, wherein the thickness of the glass substrate is less than 1.0 mm, and the total thickness of the protective glass substrate and the resin layer having removability is at least 0.1 mm.

15. The process for producing a display device by using a glass substrate with protective glass according to claim 1, wherein the difference between the linear expansion coefficient of the glass substrate and the linear expansion coefficient of the protective glass substrate is at most $15 \times 10^{-7}/°$ C.

* * * * *